Dec. 28, 1948.  W. F. DEHUFF  2,457,533
VERTICAL MIXER
Filed Sept. 5, 1945
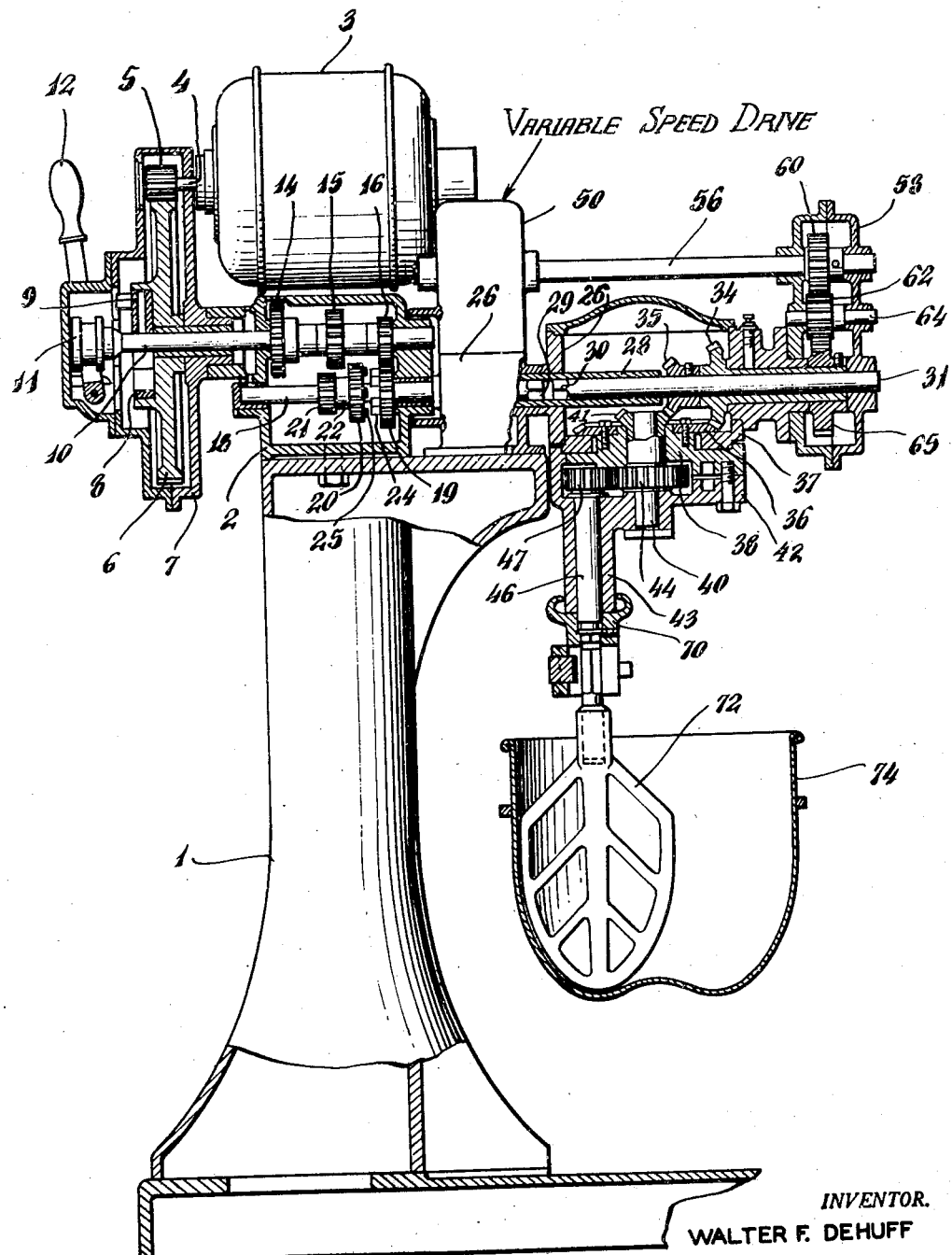
INVENTOR.
WALTER F. DEHUFF
BY
George Hastings
ATTORNEY.

Patented Dec. 28, 1948

2,457,533

UNITED STATES PATENT OFFICE 2,457,533

VERTICAL MIXER

Walter F. Dehuff, Glen Rock, Pa., assignor to American Machine & Foundry Company, a corporation of New Jersey Application September 5, 1945, Serial No. 614,535

4 Claims. (Cl. 74—300)

This invention relates to vertical dough mixers wherein a vertical beater spindle is moved in an orbital path while revolving on its own axis, more particularly to vertical mixers of the type having a variable precession ratio, that is a construction which may be adjusted to vary the rotation of the beater spindle upon its own axis relative to the movement of the spindle in its orbital path. It has been discovered for example that in mixing "foam" batches it is desirable to employ a lower precession ratio than when mixing batches of a heavier material such as bread dough.

It is therefore one of the main objects of the invention to provide a variable precession ratio mixer having a rugged, simpler and less expensive construction.

To this end I have provided a mixer construction having a vertical spindle on which the mixing beater is supported and a rotary beater head in which the spindle is revolubly mounted. The rotation of the beater head moves the spindle in an orbital path, and the spindle is driven by suitable mechanism to revolve it on its own axis while it is carried in an orbital path by the beater head. To vary the precession ratio of the rotation of the beater spindle and the rotation of the beater head, the mechanism driving the beater head may be regulated to vary the speed at which the head is driven while the rotational speed of the spindle remains approximately constant. In this manner, the precession ratio of the rotation of the beater spindle and the beater head may be varied.

In the accompanying drawing, which forms a part of this specification, there is shown a vertical section of a mixer exemplifying my invention.

Referring to the drawing, it will be seen that the base 1 supports a gear box 2 on top of which is mounted an electric motor 3. On the shaft 4 of the motor is secured a pinion 5 which drives a gear 6. This gear is mounted in a housing 7 secured to the gear box 2 in any suitable manner. Gear 6 may be provided with a friction band 8, and within the band is located the expanding drum 9 which is keyed to the driving shaft 10. A sliding sleeve 11 is actuated by the lever 12 to expand the drum 9 into engagement with the band 8 whereby the shaft 10 will be driven. Since this construction is similar to that shown in the Rataiczak et al. Patent, 1,264,128, April 23, 1918, further description is deemed unnecessary.

Shaft 10 extends into and is supported in the gear box 2. On shaft 10 are secured the large gear 14, intermediate gear 15, and the small gear 16. A shaft 18, which is mounted in suitable bearings in gear box 2, has mounted thereon a large loose gear 19, an intermediate gear 20, and a small gear 21. The gears 20 and 21 are mounted on a sliding sleeve 22 which is keyed to shaft 18, and suitable gear shifting means (not shown) may be located between gears 20 and 21. The large gear 19 is loosely mounted on shaft 18 and is always in mesh with the small gear 16 and provided with clutch pins 24. The gear 20 is provided with clutch pins 25 which will mesh with clutch pins 24 when sleeve 22 is moved to the right and thereby couple gear 19 with the shaft 18 for slow speed. Upon sliding sleeve 22 to the left to displace the gear 20 to a position intermediate the pins 24 and the gear 15, as illustrated in the drawing, the shaft 18 will not be driven. This is the neutral position in the gear transmission. When the sleeve 22 is slid further to the left, gear 20 will mesh with gear 15 to provide an intermediate speed of shaft 18. Upon sliding sleeve 22 still further to the left, the gear 21 will mesh with gear 14 to rotate shaft 18 at high speed. Any suitable gear shifting means such as described in the above mentioned Rataiczak, et al. patent may be employed to shift the sleeve 22 along shaft 18.

A housing 26 for the mechanism for driving the beater head and beater spindle, is supported on the base 1. A sleeve 28, which is journaled in housing 26, is provided with squared apertures to receive the squared end 29 of shaft 18 and the squared end 30 of shaft 31 which drives the beater spindle. A bevel gear 34 is loosely mounted on shaft 31 and in front of gear 34 is mounted a bevel gear 35 which is fastened on the shaft 31. The bevel gear 34 meshes with a bevel gear 36 which rests on a shoulder 37 of the housing 26. In a revolving casing 38, which forms a part of the beater head and is fastened to gear 36, is revolubly mounted a vertical shaft 40. At the upper end of shaft 40 is secured a bevel gear 41 which meshes with the gear 35. A plate 42, which is fastened to the bottom of casing 38 and forms the remainder of the beater head, is provided with a tubular extension 43 adjacent its periphery. In the chamber formed between plate 42 and casing 38 is located a spur gear 44 which is secured on shaft 40. The beater spindle 46 is revolubly mounted in the extension 43 and provided at its upper end with a gear 47 meshing with and driven from gear 44.

In a housing 50 supported on the housing 26 is mounted a variable speed drive which may be a sliding gear transmission of the type shown within gear box 2, a Reeves drive of the type shown in Patents 1,890,500, 2,181,079, and 2,404,380, or other suitable type of construction.

A shaft 56 is journaled in housing 50 and driven through the variable speed drive (not shown) from shaft 18.

Shaft 56 extends into a gear housing 58 supported on the housing 26. A gear 60 fastened on the portion of shaft 56 in housing 58 drives an intermediate gear 62 mounted on a shaft 64 supported in housing 58. Gear 62 drives a gear 65 which is fastened to the hub of gear 34.

It will be evident that when the shaft 18 is driven that the spindle 46 will revolve on its own axis at a speed determined by the position of sleeve 22 and the meshing of gear 20 with gear 15 or gear 21 with gear 14. The beater head will revolve more slowly and its speed will be determined by regulating the speed at which shaft 58 is driven through the variable speed drive, to drive the bevel gear 36 on the casing 38 at a faster or slower speed. Thus by regulating the speed at which the gear 36 is driven, while the speed of the spindle 46 remains approximately constant, the precession ratio of the rotation of the speed of the spindle 46 and the beater head may be varied. A suitable precession ratio for "foam" batches is 2:1, while a ratio of 4:1 has been found suitable for cake dough and other heavier type doughs. Accordingly, the variable speed drive in housing 50 should be designed to supply these two precession ratios.

A socket member 70 is secured on the lower end of the beater spindle 46. Since the construction of the socket member is similar to that shown in the above mentioned Ratajczak, et al. patent, further description thereof is deemed unnecessary except to state that the upper end of the beater 72 is secured in the socket member 70 in the manner described in said patent.

The mixing bowl 74 is supported by suitable structure shown in said patent in position to permit the batch of material therein to be mixed by rotation of the beater upon its own axis while it is moved in an orbital path within the bowl.

What is claimed is:

1. In a mixer, the combination with a vertical shaft, of a head revolubly mounted for rotation about the axis of rotation of said shaft, a vertical spindle revolubly mounted in said head with its axis eccentric to the axis of rotation of said head, whereby the rotation of said head will move said spindle in an orbital path, a bevel gear fastened to and coaxial with said head, a bevel gear fastened to said vertical shaft, a horizontal shaft, a bevel gear loosely mounted on said horizontal shaft and meshing with and driving the bevel gear secured to the head, a bevel gear fastened on said horizontal shaft and meshing with and driving the bevel gear fastened on said vertical shaft, a pinion secured on said vertical shaft, a gear secured on said spindle and meshing with said pinion, driving mechanism for driving said horizontal shaft whereby said spindle will be revolved on its own axis, and a variable speed device driven from said driving mechanism and connected to and driving the bevel gear loosely mounted on said horizontal shaft whereby said head will be revolved to move said spindle in an orbital path, said device being operable to vary the speed at which said head is revolved and thereby to vary the precession ratio of the rotation of the spindle relative to the rotation of the head.

2. In a mixer, the combination with a head revolubly mounted for rotation about a stationary axis, of a spindle revolubly mounted in said head with its axis of rotation eccentric to the axis of rotation of said head whereby said spindle will be moved in an orbital path upon rotation of said head, means for driving said spindle to revolve it on its own axis while it is moved in an orbital path by said head, a gear rigidly secured to said head, a horizontal shaft, a pinion mounted on said horizontal shaft and meshing with and driving said gear, and a variable speed drive which is driven from said spindle driving means and connected to and adapted to drive said pinion to cause said head to revolve and move said spindle in an orbital path, said variable speed drive being adjustable to vary the speed at which said head is revolved and thereby vary the precession ratio of the rotation of the spindle relative to the rotation of the head.

3. In a mixer, the combination with a support revoluble about a stationary axis, of a spindle revolubly mounted in said support with its axis of rotation eccentric to the axis of rotation of said support whereby said spindle will be moved in an orbital path upon rotation of said support, a bevel gear fastened to and coaxial with said support, a pinion meshing with and driving said bevel gear, means for driving said spindle to revolve it on its own axis while it is moved in an orbital path by said support, and mechanism driven from said spindle driving means for driving said pinion and thereby revolving said support to move said spindle in an orbital path with a predetermined precession ratio relative to the rotation of said spindle, said mechanism including a variable speed drive driven from said spindle driving means and connected to and driving said pinion and adapted to vary the speed at which said pinion is driven and thereby vary the speed at which said support is revolved to thereby vary the precession ratio of the rotation of the spindle relative to the rotation of the support.

4. In a mixer, the combination with a vertical shaft, of a gear secured to the upper end of said vertical shaft, a head revolubly mounted for rotation upon said shaft, a gear secured to said head, a vertical spindle mounted in said head with its axis eccentric to the axis of rotation of said head, a primary gear mounted on said vertical shaft, a gear mounted on said spindle and meshing with said primary gear, a driving shaft, a primary pinion fastened on said driving shaft and meshing with the gear secured to the upper end of said vertical shaft, a secondary pinion loosely mounted on said driving shaft and meshing with the gear secured to said head, means for driving said primary pinion to cause said spindle to revolve on its own axis, and a variable speed drive device driven from said spindle driving means and driving said secondary pinion to revolve said head and thereby move said spindle in an orbital path, said device being operable to vary the speed at which said head is revolved and thereby vary the precession ratio of the rotation of the spindle relative to the rotation of the head.

WALTER F. DEHUFF.

REFERENCES CITED

The following references are of record in the file of this patent:

UNITED STATES PATENTS

| Number | Name | Date |
|---|---|---|
| 1,264,128 | Ratajczak | Apr. 23, 1918 |
| 1,859,690 | Aeschbach | May 24, 1932 |
| 2,019,911 | Johnston et al. | Nov. 5, 1935 |